G. O. PAGE.
HOOK AND WIRE ATTACHING MACHINE.
APPLICATION FILED JULY 1, 1918.

1,333,994.

Patented Mar. 16, 1920.
8 SHEETS—SHEET 1.

INVENTOR
G. O. PAGE.
BY D. Anthony Usina
ATTORNEY

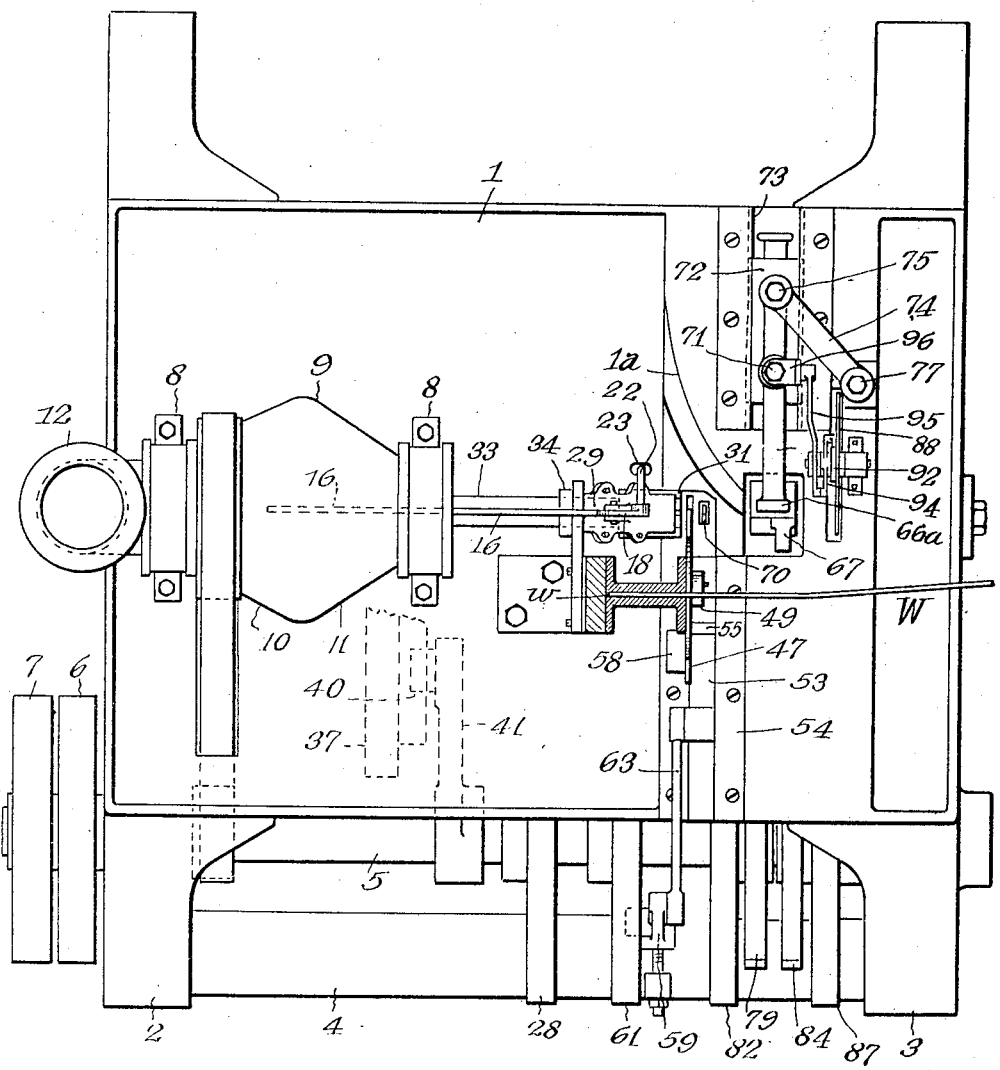

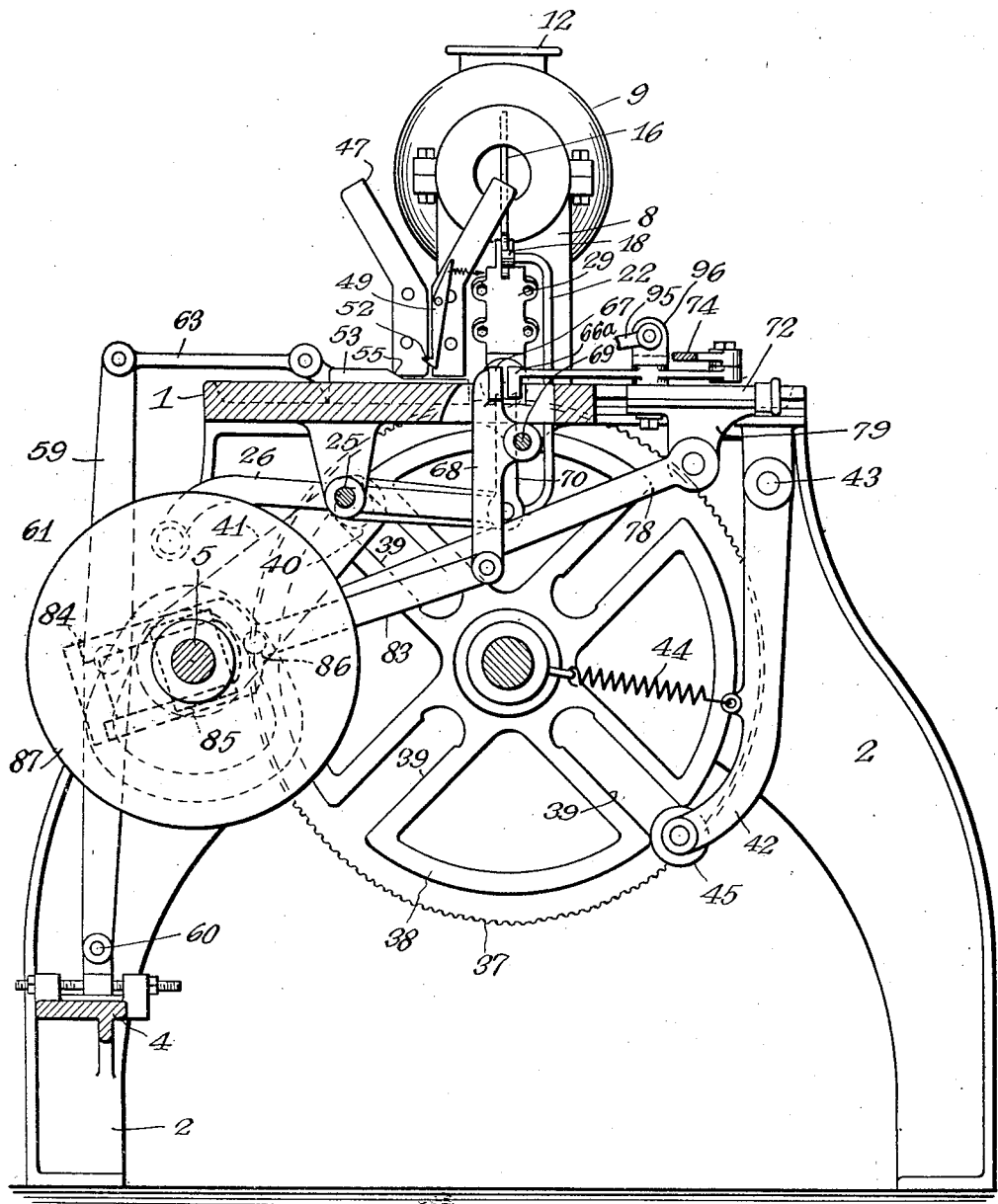

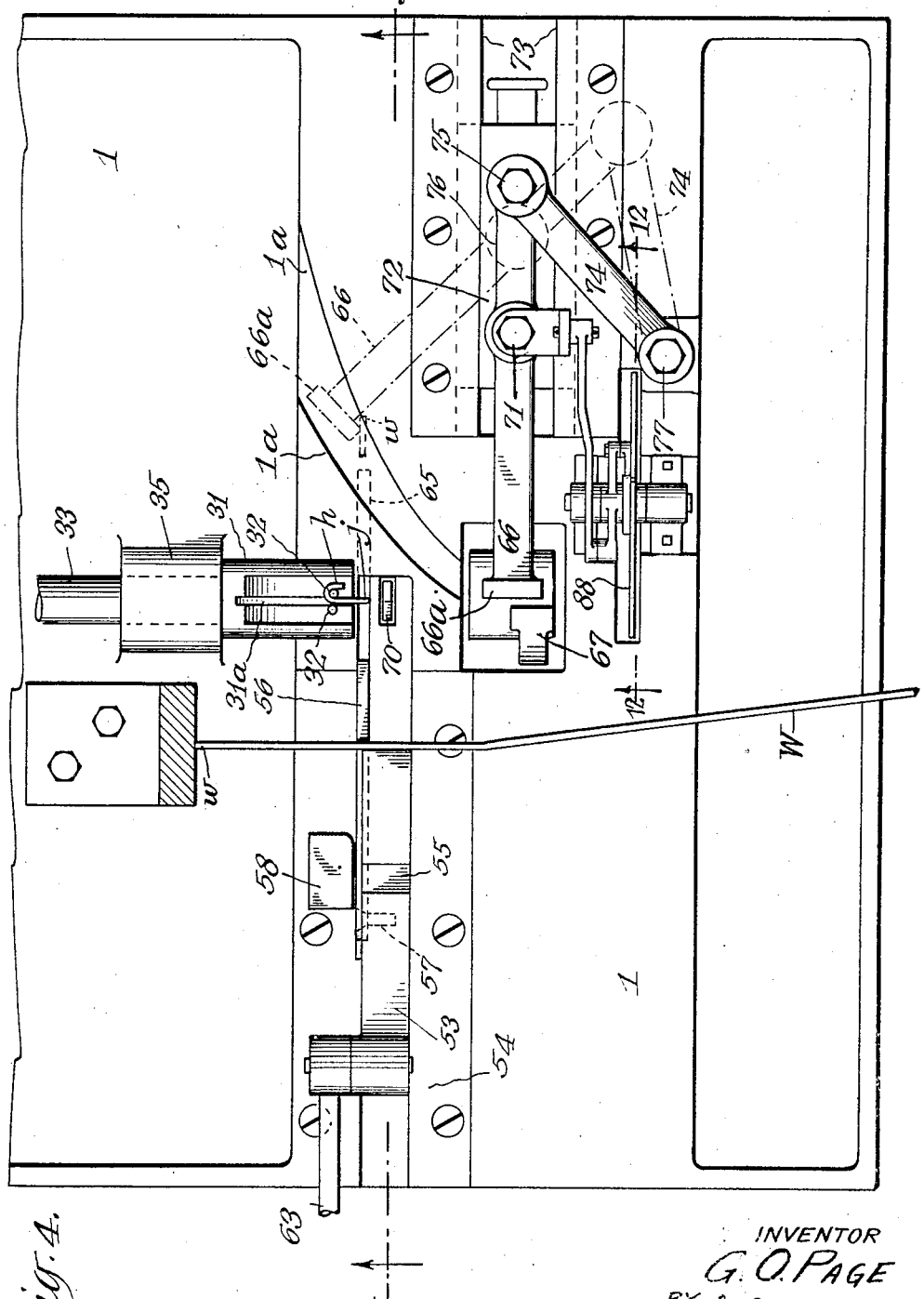

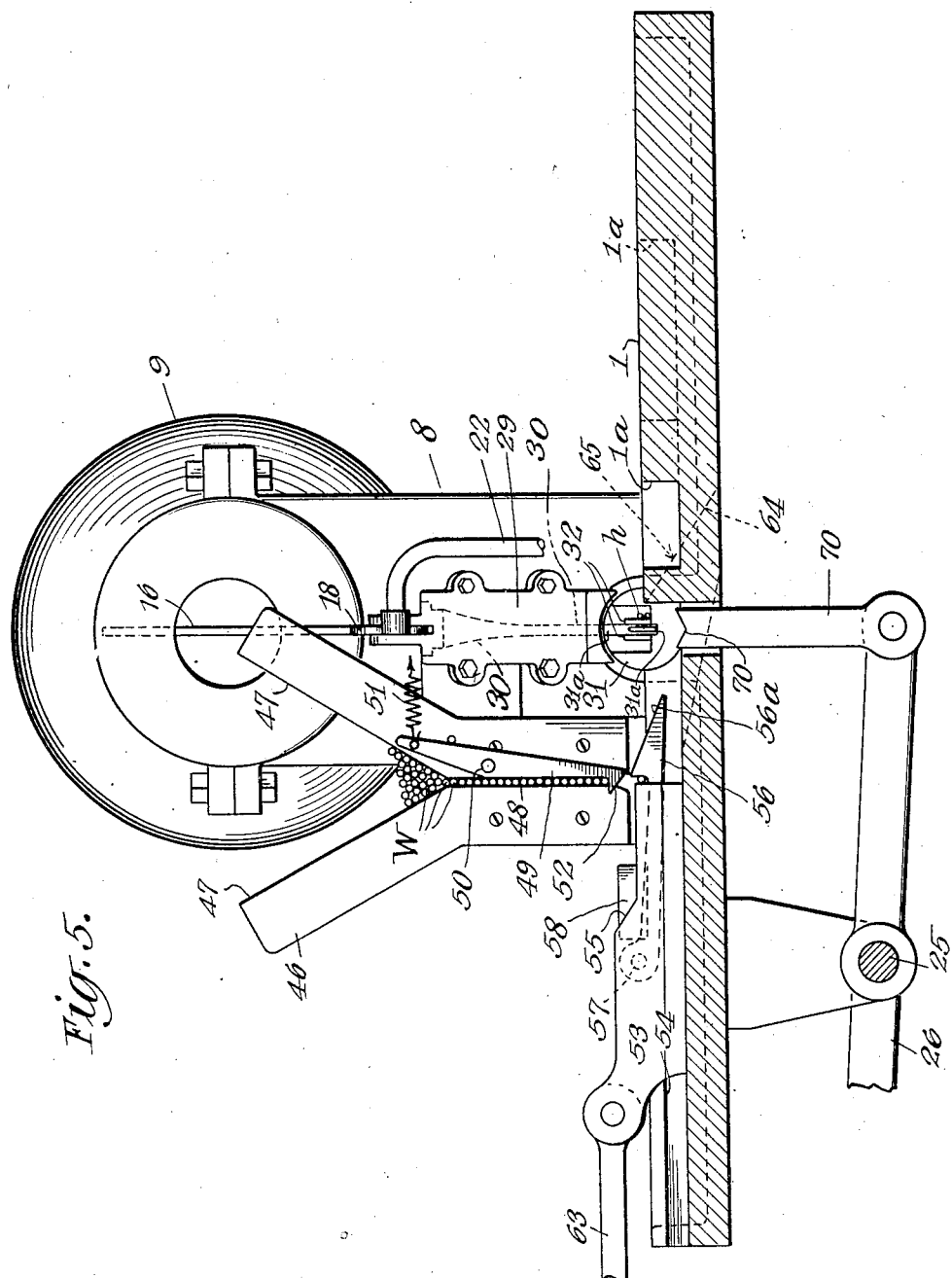

G. O. PAGE.
HOOK AND WIRE ATTACHING MACHINE.
APPLICATION FILED JULY 1, 1918.
1,333,994.
Patented Mar. 16, 1920.
8 SHEETS—SHEET 6.
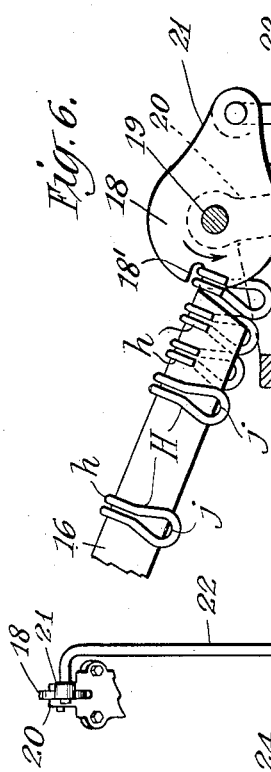
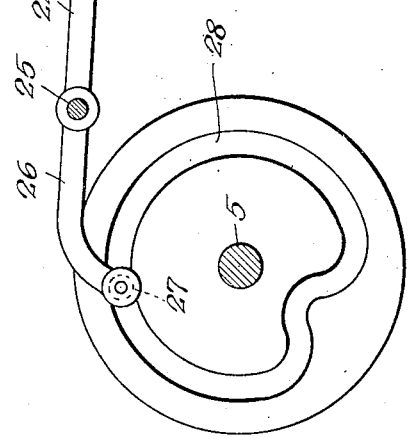
INVENTOR
G. O. PAGE
BY
D. Anthony Usina
ATTORNEY G. O. PAGE.
HOOK AND WIRE ATTACHING MACHINE.
APPLICATION FILED JULY 1, 1918.
1,333,994.
Patented Mar. 16, 1920.
8 SHEETS—SHEET 7.
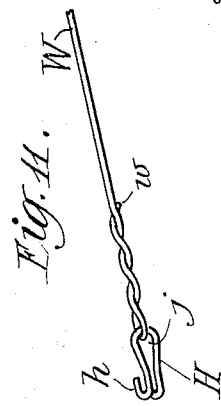
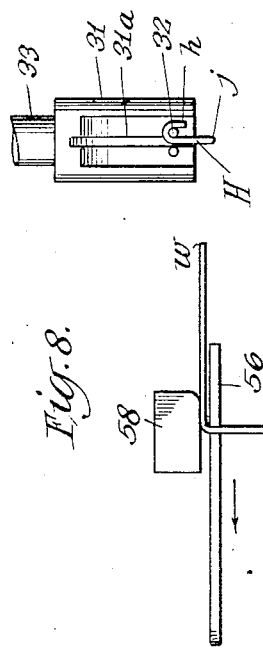
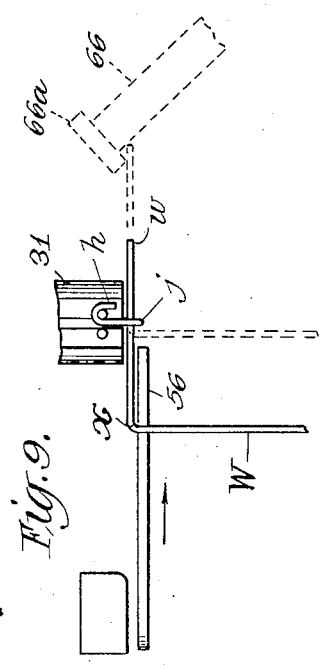
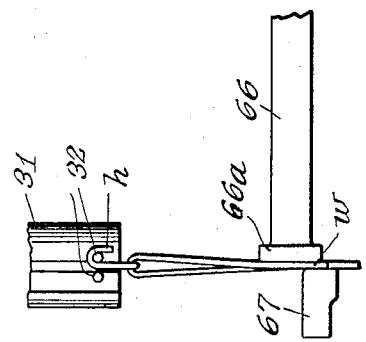
INVENTOR
G. O. PAGE.
BY D. Anthony Usina
ATTORNEY G. O. PAGE.
HOOK AND WIRE ATTACHING MACHINE.
APPLICATION FILED JULY 1, 1918.
1,333,994.
Patented Mar. 16, 1920.
8 SHEETS—SHEET 8.
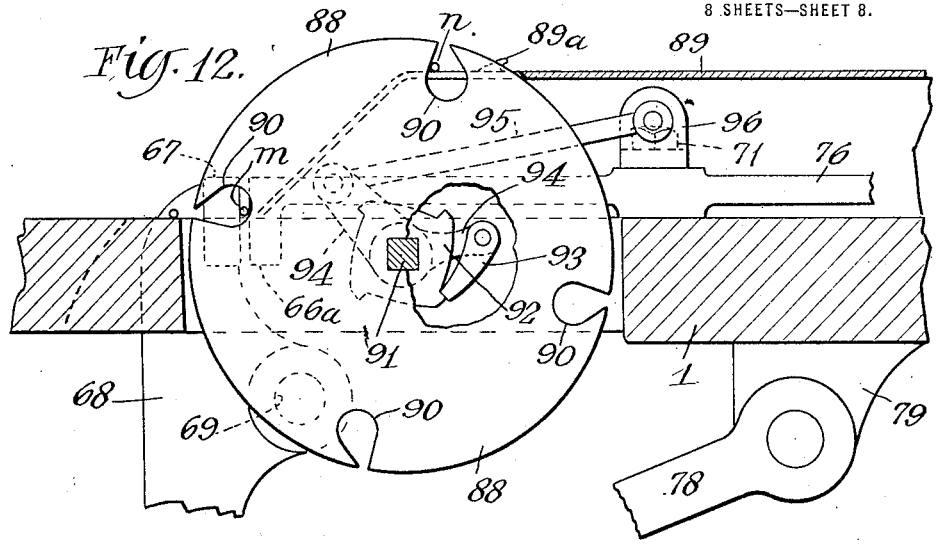
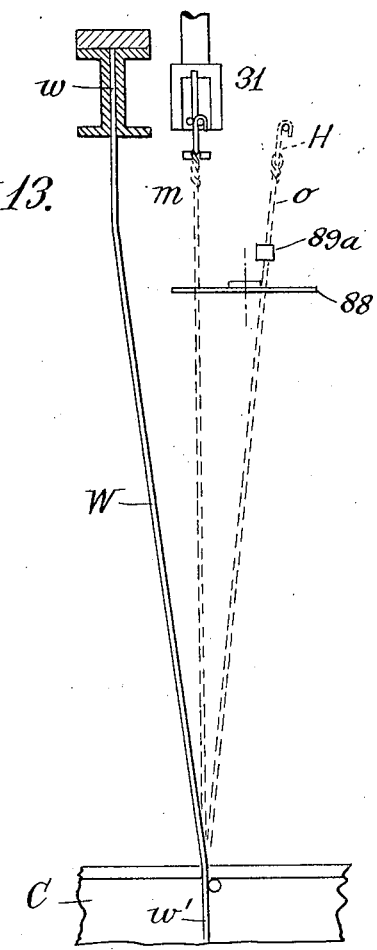
INVENTOR
G. O. PAGE
BY
D. Anthony Usina
ATTORNEY

UNITED STATES PATENT OFFICE.

GEORGE O. PAGE, OF CLEVELAND, OHIO, ASSIGNOR TO AMERICAN STEEL & WIRE COMPANY OF NEW JERSEY, A CORPORATION OF NEW JERSEY.

HOOK AND WIRE ATTACHING MACHINE.

1,333,994.

Specification of Letters Patent. Patented Mar. 16, 1920.

Application filed July 1, 1918. Serial No. 242,772.

*To all whom it may concern:*

Be it known that I, GEORGE O. PAGE, a citizen of the United States, residing at 9423 Anderson avenue, S. E., Cleveland, Ohio, have invented certain new and useful Improvements in Hook and Wire Attaching Machines, of which the following is a specification.

This invention relates to machines for automatically attaching bale tie wires to special hooks which are made by another independent machine.

One of the objects of the invention is to attach hooks to bale tie wires by means of an automatic machine thereby increasing the output of completed bale ties in a given time. A further object is to provide a machine which will effectively feed bale tie hooks into position to have a tie wire threaded automatically through the eye thereof. Another object is to provide means for feeding bale tie wires through the eyes of special hooks. A still further object is to provide means for forming a loop in a bale tie wire after the same has been fed through the eye of a special hook. A still further object is to provide means for twisting the loop and thereby securely fastening the hook and the bale tie in an interlinked condition. A still further object is to combine a plurality of instrumentalities in such a way that they will efficiently perform the functions hereinafter set forth. Other objects will be apparent from the following description and appended claims.

The machine comprises essentially a rotary magazine for agitating and feeding the hooks, a stringer by means of which the hooks are conveyed, a rocking picker which removes one hook at a time from the stringer, a twisting spindle and an arcuate guide chute which guides the hook to and deposits it in its operative position on the twisting spindle. For handling the bale tie wires I provide a magazine, a device for singly feeding the foremost wire therefrom, a cross-head (coöperating with a former) for bending the wire, and feeding it through the eye of the hook held by the twisting spindle, a folding device for completing the loop in the bale tie wire partially formed by the above-mentioned cross-head, a clamp for holding the ends of the loop while the twisting spindle rotates, an expeller which disengages the hook and bale tie from the twisting spindle, and an ejector which removes the completed bale tie and deposits it on a platform provided for the purpose.

The invention consists in the means for accomplishing the objects above set forth, various instrumentalities herein described, and the combinations and sub-combinations of elements for performing the functions to be hereinafter described and particularly pointed out in the appended claims.

Referring to the drawings, Figure 1 is a front elevation partly in section of a complete machine;

Fig. 2 is a plan view thereof;

Fig. 3 is a view partly in side elevation and partly in section, being viewed substantially on the line 3—3 of Fig. 1;

Fig. 4 is an enlarged view in plan illustrating in full lines a bale tie wire about to be engaged by a reciprocating hook, and in dotted lines another position of a bale tie wire in which it is about to be engaged by the loop folder;

Fig. 5 is a detail section substantially on the line 5—5 of Fig. 4;

Fig. 6 is an enlarged vertical longitudinal section illustrating the picker, a portion of the stringer and the twisting spindle;

Fig. 7 is a detail view of the means for operating the picker being a section on the line 7—7 of Fig. 1;

Figs. 8, 9 and 10 are diagrammatic views illustrating different steps in the operation of securing the bale tie to the hook;

Fig. 11 is a detail view showing a bale tie as it is secured to a hook in the present machine;

Fig. 12 is a detail section on line 12—12 of Fig. 4 showing the ejector disk and the driving mechanism thereof;

Fig. 13 is a diagrammatic plan illustrating the operation of the ejector disk.

Figure 1:
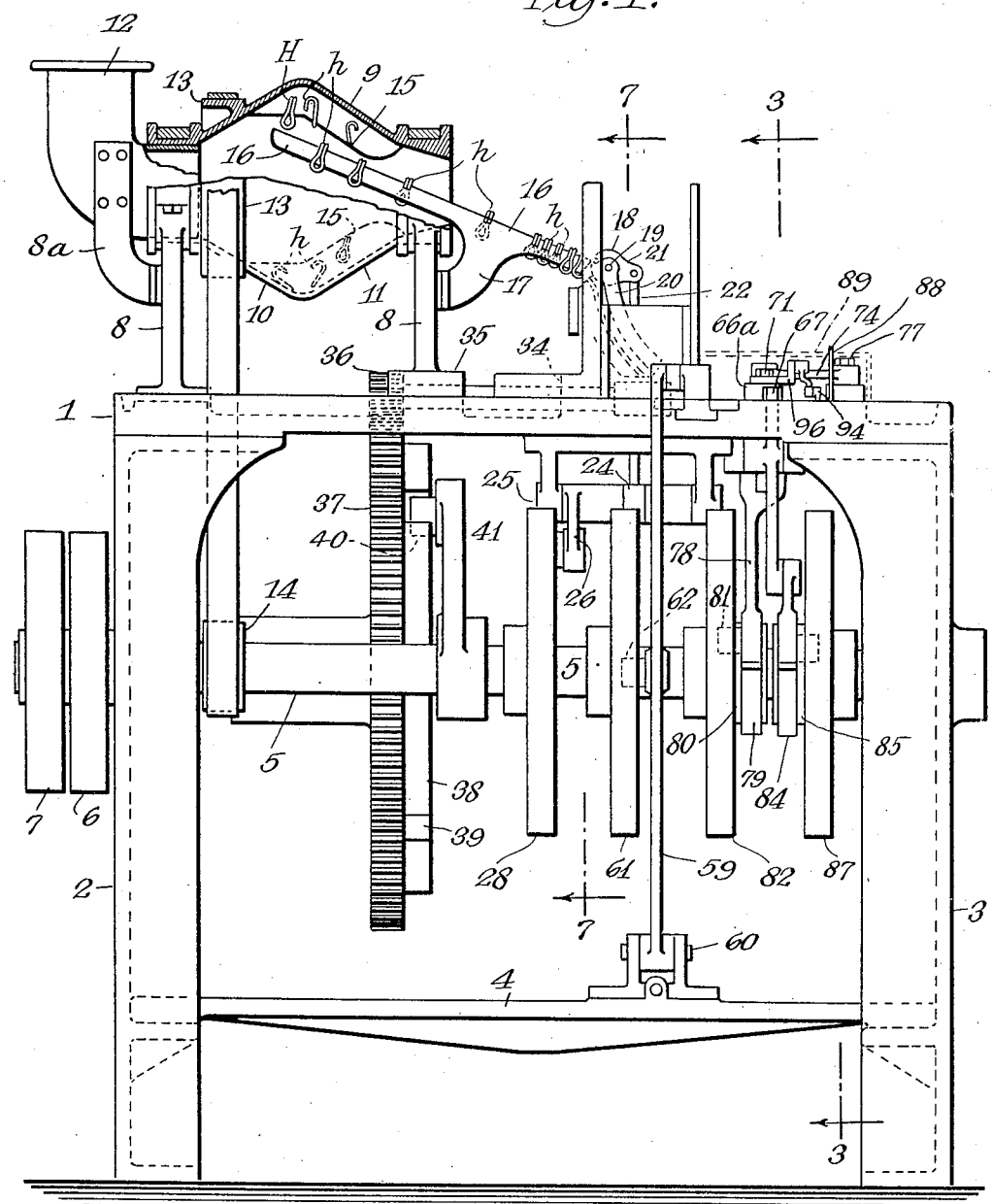

Referring to Fig. 1, the machine frame consists of a top base plate 1 supported by side frames 2 and 3 which are joined near the bottom by a cross-member 4.

A main shaft 5 is secured in suitable bearings formed in the side frames 2 and 3 and carries on its outer end tight and loose pulleys 6 and 7. To the top plate 1 of the machine are secured uprights 8—8 in which a magazine 9 having oppositely inclined sides 10 and 11 is rotatably mounted. A stationary hopper 12 which communicates with the interior of the magazine 9 is secured to a bracket 8ᵃ supported by the rear upright 8. The magazine is rotated by a pulley 13 formed thereon which is driven by a similar pulley 14 secured to the main shaft 5.

Special hooks H are introduced into the magazine through the hopper 12 and upon rotation of the magazine the ribs 15 thereof will cause considerable agitation of the hooks contained therein carrying some of them to such position that when they fall their hooked ends $h$ will catch upon the inclined stringer 16, the extension 17 of which is secured to one of the uprights 8, as shown.

The hooks H will slide by gravity down the inclined stringer 16 (Figs. 1 and 6) until their travel is arrested by the picker 18 which is pivoted at 19 to a bracket 20. The picker has an extended arm 21 which is connected to a link 22 which extends downwardly through an aperture 23 of the top plate and is in turn connected to the free end of a lever 24, which lever is secured to a shaft 25 adapted to be rocked by a lever 26 having a cam roller 27 on the end thereof which travels in a suitable groove in the cam 28 secured to the main shaft 5. The cam groove for actuating the lever 26 is so proportioned that it will intermittently oscillate the picker 18, which action will singly pick the foremost hook from the stringer 16, the hook having entered the notch 18' formed in the picker as clearly shown in Fig. 6. After the picker has rocked through a short distance it will drop the hook into an arcuate chute 29 having a groove 30 therein which will guide the hook in its downward travel. The chute 29 terminates in close proximity to the twisting spindle 31 which is provided with two holding pins 32—32 located on opposite sides of the guide groove 31ᵃ in the spindle. The twisting spindle is provided with two pins 32 because in the agitation of the hooks in the magazine it is quite likely that the hooks will be caught on the stringer in oppositely disposed relationship, and, therefore, one or the other of the pins will properly coöperate with the portion $h$ of the hook no matter which way the hook happens to be turned when it is delivered to the picker.

The twisting spindle is conveniently formed by fashioning an enlarged head on the end of the twisting shaft 33. The shaft 33 is supported in bearings 34 and 35 formed in the top plate 1 and at one end has secured thereto a pinion 36 which meshes with the large gear 37, which is provided with a boss 38 having grooves 39 formed therein which grooves coöperate with a roller 40 carried on the free end of a lever 41 secured to the main shaft 5. As thus constructed it is clear that the arm 41 will intermittently partially rotate the gear 37 thereby intermittently transmitting several rotations to the twisting spindle through pinion 36. A brake 42 pivoted at 43 by aid of the spring 44 and roller 45 which coöperates with the slots 39 serves to accurately stop the twisting spindle in position to receive a hook from the chute 29 as shown in Figs. 5 and 6.

The inner ends $w$ of a stack of bale tie wires W are retained in the magazine 46 which has sides 47—47 converging to the guide-way 48, which is only of sufficient width to admit the bale tie wires in a single line or row as clearly shown in Fig. 5. These wires are of considerable length and their outer ends $w'$ are suitably supported on a bench C as shown in Fig. 13.

A discharge pawl 49 is pivoted at 50 to one face of the magazine and the spring 51 secured to one end thereof, tends normally to maintain the same in the position shown in Figs. 3 and 5, and in this position, the hooked end 52 thereof will retain the tie wires in the magazine.

A wire feeding cross-head 53 (Figs. 4 and 5) guided in suitable slide-ways 54 formed in the top plate 1, is provided with an inclined cam surface 55 which upon the forward movement thereof engages the hooked end 52 of the discharge pawl 49 and rocks the pawl about its pivot 50 thereby releasing the bottommost tie wire from the magazine. A wire gripper 56 is pivoted at 57 to the one side of the cross-head 53 and upon the backward movement of the slide 53 it will engage the tie wire and draw it rearwardly until one portion thereof engages the bending block 58. A further backward travel of the gripper will cause a right angle bend to be made in the wire as shown in Fig. 8. After this has taken place, the cross-head 53 will move forward carrying with it the wire so bent and thereby feeding the end $w$ through the eye $j$ of the hook.

The cross-head 53 is moved back and forth by means of a lever 59 pivoted at 60 to a suitable bracket secured to the cross-member 4, the lever being oscillated by means of a cam 61 and a roller 62 co-acting therewith, a link 63 connecting the lever and the cross-head as clearly shown in Figs. 1 and 3.

With the parts in the position previously described, one end of the tie wire will have been threaded through the eye $j$ of the hook H as illustrated in Fig. 9. As the cross-head completes its forward movement, notch $w$ of the wire will be moved up into engagement with the body of the hook H, (as shown in dotted lines in Fig. 9). At this time the inclined end 56ᵃ of the gripper 56 (Fig. 5) will have engaged the inclined undercut cam surface 64 of the aperture 65 formed in the top plate, which action will rock said gripper on its pivot 57 thus disengaging it from the tie wire and also preventing it from interfering with the hook H held by the twisting spindle.

After the tie wire has been moved to the position shown in dotted lines in Fig. 9, in which the notch $x$ contacts with the eye $j$ of the hook, the end $w$ which was fed through the eye will then be in position to be engaged by the loop folder 66, as shown in dotted lines in Figs. 4 and 9, which will act to bend this end of the wire around, thus completing the loop and interlocking the tie wire and the hook H, as shown in Fig. 10. After the loop is so formed the jaw 67 of the clamp lever 68 which is pivoted at 69 (Figs. 3 and 4) will move forward and thus clamp both parts of the wire which form the loop. At this time, the roller 40 on the rotating arm 41 will enter a slot 39 of the gear 37 thus imparting several rotations to the pinion 36 and the twisting spindle 31, which action will obviously rotate the hook H held by the holding pin 32 thereby twisting the two portions of the wire forming the loop into the condition shown in Fig. 11.

An expeller 70 (Fig. 5) having a V shaped depression in the top thereof is provided for disengaging the completed bale tie from the twisting spindle and an ejector disk 88 (Fig. 12) as hereinafter described, is provided, for depositing them on a suitable platform 89 which may be secured to the base 1 for the purpose.

The ejector disk 88 has slots 90 formed therein as shown in Fig. 12 which are arranged to intermittently come into register with the axis of the twisting spindle to permit the bale tie to enter therein. The disk 88 is secured to a shaft 91 and actuated by a ratchet 92 also secured thereto. The ratchet 92 is driven by a pawl 93 pivotally connected to one end of a lever 94 loosely pivoted on the shaft 91. A link 95 connects the lever with an angle bracket 96 which is secured by a bolt 71 to a reciprocating cross-head 72 to be hereinafter described. As the bale tie wire W is fed toward the hook H held by the twisting spindle it enters one of the slots 90 in the disk 89 as shown at $m$ in Fig. 12. After the twisting operation has been completed the disk is given a quarter turn which carries the bale tie to the position indicated at $n$ in the figure, the expeller 70 having lifted the hook clear of the pins in the twisting spindle. During the subsequent intermittent movement of the disk the bale tie is carried over a hooked stop 89ª secured to the platform 89 as shown at $o$ in Fig. 13, the stop 89ª effectively preventing the bale tie from springing back.

The loop folder 66 above mentioned is pivoted at 71 (Figs. 2 and 4) to a cross-head 72 guided in ways 73 in the top plate 1. A link 74 is connected at 75 to the arm 76 of the loop folder 66, and the opposite end of this link 74 is pivotally secured to the top plate 1 by a stud 77 as shown. The cross-head 72 is reciprocated by means of a lever 78, Fig. 3, which is pivotally connected to a lug 79 depending from the underside of the cross-head. One end of the lever 78 is forked as at 79 and guided by block 80 loosely mounted on the main shaft 5 and a roller 81 secured to the lever 78 coöperates with a suitable groove in the cam 82 to reciprocate the cross-head. With the parts thus arranged it is clear that the free end of the loop folder will move in the necessary curved path to bend the end of the tie wire around to position to form the complete loop as above described. It being clear that as the cross-head moves back and forth, the arm 66 of the loop folder will oscillate about the pivot 71 due to its connection by the link 74 with the fixed pivot 77. The free end of the loop folder 66 is provided with an enlarged head 66ª which projects slightly below the plane of the surface of the top plate 1. A curved groove 1ª is formed in the top plate and the outlines of this groove are defined by the path of the head 66ª of the loop folder. The purpose of having the head 66ª formed on the loop folder is to have the top and bottom surfaces thereof project slightly beyond the top and bottom surfaces of the wire being folded, thereby positively preventing the wire from slipping either under or over the end 66ª of the said loop folder.

The clamp 68 above referred to receives its motion from a lever 83 (Fig. 3) which is forked at 84 and guided on a block 85 loosely mounted on the main shaft 5. This lever is provided with a suitable roller 86 adapted to coöperate with a groove formed in a cam 87 the rotation of which will oscillate the lever 68 in an obvious manner.

From the foregoing it will be seen that various combinations of instrumentalities have been assembled in such a manner as to simply and effectively feed special hooks singly to a position where a bale tie wire may be threaded through the eyes thereof and interlocked and secured thereto in a simple, rapid and inexpensive manner. While I have described with great particularity the embodiment of the invention shown it is to be understood that the description and drawings are to be interpreted in an illustrative and not in a limiting sense, and changes may be made therein without departing from the spirit and scope of the invention.

What I claim:—

1. A hook and wire attaching machine including a twisting spindle, said spindle having holding pins thereon for positioning the hooks and being adapted to engage the hooked ends of said hooks, means for feeding hooks singly to said pins, a feeding device for threading a wire through the eye of the hook carried by said twisting spindle, a loop former for bending said wire and a clamp for holding the wire during the rotation of the twisting spindle.

2. A hook and wire attaching machine including a twisting spindle, said spindle having holding pins thereon for positioning the hooks and being adapted to engage the hooked ends of the hooks, a feeding device for threading a wire through the eye of the hook carried by said twisting spindle, a loop former for bending said wire and a clamp for holding the wire during the rotation of the twisting spindle.

3. A hook and wire attaching machine including a stringer having an inclined upper edge on which the hooks are deposited and strung in a row, and are conveyed by gravity to the lower end of said stringer, a picker mechanism coacting with the lower end of said stringer to intermittently remove the lowermost hook strung on the said stringer, said picker mechanism being arranged to prevent the removal of a second hook with the lowermost hook on the stringer, a wire twisting spindle, means for delivering the hooks removed by said picker mechanism into position for engagement by the end of a wire to which the hook is to be attached, and means for twisting said wire to attach said hook thereto.

4. A hook and wire attaching machine including an inclined stringer on which a row of hooks are conveyed by gravity, a rotary magazine adapted to contain a quantity of hooks in bulk and arranged to assemble the hooks in a row on said stringer, a twisting spindle, and means for successively removing and transferring the lowermost hook on said stringer to said twisting spindle, said means being arranged to prevent the removal from the stringer of a second hook with the successively lowermost hook on said stringer.

5. A hook and wire attaching machine including a rotary magazine adapted to receive the hooks in bulk, an inclined stringer having one end extending into said magazine, said magazine being arranged to deposit the hooks in a row on said stringer when the magazine is rotated, and said inclined stringer conveying the row of hooks thereon out of the magazine, and a picker mechanism adjacent to the lower end of said inclined stringer arranged to receive and remove the lowermost hook from said stringer and to prevent the removal of a second hook with said lowermost hook, means for receiving and holding said hooks in a predetermined position, and means for securing said hooks to the ends of the bale wires.

6. A hook and wire attaching machine including a rotatable twisting spindle having holding pins thereon for positioning a hook, a feeding device for threading a wire through the eye of the hook carried by said twisting spindle, a loop former for bending said wire and a clamp for holding the wire against rotation during the rotation of the twisting spindle.

7. A hook and wire attaching machine including means for agitating a quantity of hooks and depositing them in a single line on a stringer and means for intermittently removing the foremost hook from said stringer and conveying it to a predetermined position, a twisting spindle having holding pins adapted to receive the hooks from said stringer and to position the hook on said spindle, a feeding device for threading a wire through the eye in the hook held by said twisting spindle, means for forming a loop in the wire so fed, and a clamp for holding the wire during the rotation of the twisting spindle.

8. A hook and wire attaching machine comprising an inclined stringer arranged to convey hooks by gravity and a picker coacting therewith to intermittently remove one hook at a time from said stringer, a magazine for wires, means for feeding the foremost wire from the magazine, means for forming a right angle bend therein and feeding the end so bent through the eye of the hook held by the twisting spindle, a loop former for bending the end so fed around to such position as to interlink the hook and the tie wire, means for clamping portions of the tie wire so bent, and means for rotating the said twisting spindle to twist the looped tie wire to securely interlink the loop with the eye of the hook.

9. A hook and wire attaching machine including a rotary magazine adapted to receive the hooks in bulk, an inclined stringer having one end extending into said magazine, said magazine being arranged to deposit the hooks in a row on said stringer when the magazine is rotated, and said inclined stringer conveying the row of hooks thereon out of the magazine, a picker mechanism adjacent to the lower end of said inclined stringer arranged to receive and remove the lowermost hook, an intermittently rotated wire twisting spindle, and gravity means for conveying the hooks from said picker mechanism to said twisting spindle.

10. A hook and wire attaching machine including a magazine for hooks, a stringer arranged to receive hooks from said magazine, a twisting spindle, a picker and a guide chute for transferring the foremost hook from said stringer to said twisting spindle, a magazine containing bale tie wires in such a position that their axes lie in a plane at right angles to the axis of the eye of the hook held by said twisting spindle, means for feeding the foremost wire from the magazine, and means for bending one end of the wire so fed into a position substantially in axial alinement with the eye of the hook held by the twisting spindle, means for threading the end of the wire so bent through the eye of said hook, and means for forming a loop in the end of said wire, a clamp for holding portions of said loop and means for intermittently rotating said twisting spindle to securely interlink the tie wire with the eye of said hook.

11. A hook and wire attaching machine including a rotary magazine for agitating a plurality of hooks, an inclined stringer adapted to receive hooks from said magazine, a twisting spindle having holding pins located therein and means for intermittently feeding the hooks to said twisting spindle in such a position that the end portions of said hooks will engage the holding pins in said twisting spindle and the eye of said hook will project beyond the plane of the forward end of the twisting spindle.

12. A hook and wire attaching machine including a twisting spindle having at least one holding pin located therein, a guide chute shaped to convey the hooks and turn them through an angle of substantially ninety degrees to position them for engagement with a holding pin carried by said twisting spindle, and means for feeding one hook at a time to said guide chute.

13. A hook and wire attaching machine including a twisting spindle having two holding pins therein disposed substantially at right angles to the axis of the spindle, and a guide chute shaped to convey the hooks to said spindle and to position them so that their hooked ends will engage either one or the other of said holding pins.

14. A hook and wire attaching machine including a twisting spindle having two holding pins therein disposed substantially at right angles to the axis of the spindle, a picker adapted to feed the hooks singly to said chute, and a stringer arranged to convey the hooks to said picker in such positions that their hooked ends will engage said picker thereby insuring them being delivered to the guide chute in position to engage the holding pins in the twisting spindle.

15. A hook and wire attaching machine including a twisting spindle having at least one holding pin, means for singly feeding hooks and guiding them so that their hooked ends will engage one of said holding pins, and means for intermittently rotating and stopping said spindle so that the holding pins will be in position for engagement with the hooks fed thereto.

In witness whereof, I have hereunto signed my name.

GEORGE O. PAGE.